United States Patent [19]

Hollis

[11] Patent Number: 5,482,309
[45] Date of Patent: Jan. 9, 1996

[54] SCISSOR CLOSURE COUPLER FOR GOOSENECK TRAILERS

[76] Inventor: Michael S. Hollis, 1326 East St., Minden, La. 71055

[21] Appl. No.: 209,468

[22] Filed: Mar. 14, 1994

[51] Int. Cl.$^6$ .................................................. B62D 1/06
[52] U.S. Cl. ............................. 280/423.1; 280/441.2; 280/511; 280/512; 280/901
[58] Field of Search ........................... 280/417.1, 406.2, 280/416.3, 417.1, 423.1, 425.2, 441.2, 455, 493, 504, 511, 512, 901

[56] References Cited

U.S. PATENT DOCUMENTS

| | | | |
|---|---|---|---|
| 3,659,876 | 5/1972 | Melton | 280/901 |
| 4,320,907 | 3/1982 | Eaton | 280/901 |
| 5,040,817 | 8/1991 | Dunn | 280/511 |
| 5,080,386 | 1/1992 | Lazar | 280/477 |
| 5,120,080 | 6/1992 | Ritter | 280/433 |
| 5,147,096 | 9/1992 | Rogers | 280/507 |
| 5,161,815 | 11/1992 | Penor, Jr. | 280/477 |
| 5,167,423 | 12/1992 | Hall, Jr. | 280/486 |
| 5,385,363 | 1/1995 | Morey | 280/511 |

*Primary Examiner*—Mitchell J. Hill
*Attorney, Agent, or Firm*—Richard L. Miller

[57] ABSTRACT

A scissor coupler, for attaching to a trailer hitch ball having a widest point and a neck, comprising a top plate, a bottom plate, a hinge bolt, and a main spring connected between the top plate and bottom plate. The hinge bolt attaches the top plate and bottom plate so that they can pivot relative to one another from a closed position to an open position. The top plate and bottom plate have top plate and bottom plate bores that have a slightly larger diameter than the widest point of the trailer hitch ball, and are concentric when the top plate and bottom plate are in the open position. The top plate and bottom plate bores are not concentric when the scissor coupler is in the closed position. When the top plate and bottom plate are in the closed position, an elliptical hole is formed therebetween that is narrower than the widest point but wider than the neck of the trailer hitch ball. The main spring biases the scissor coupler to the closed position.

6 Claims, 2 Drawing Sheets

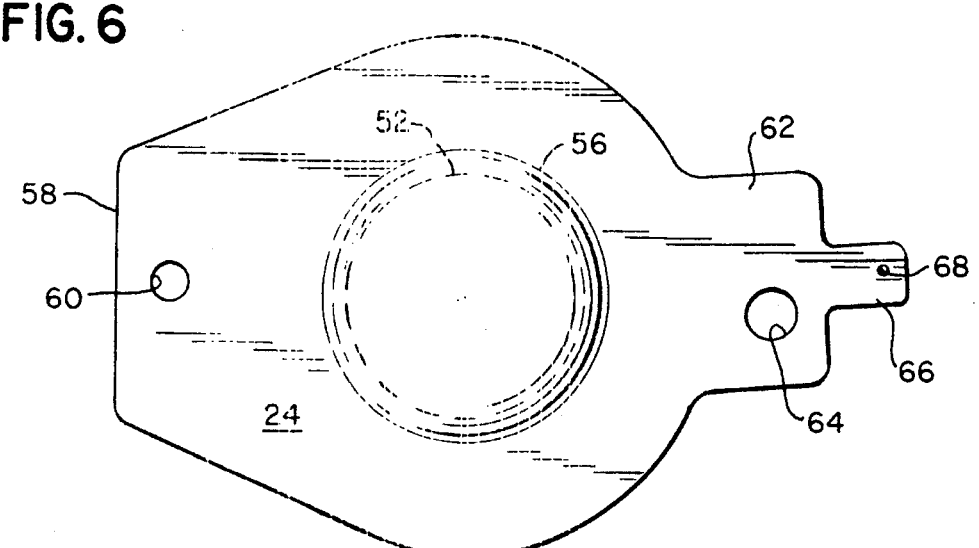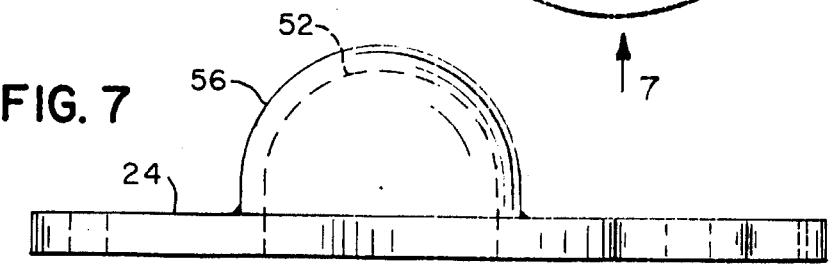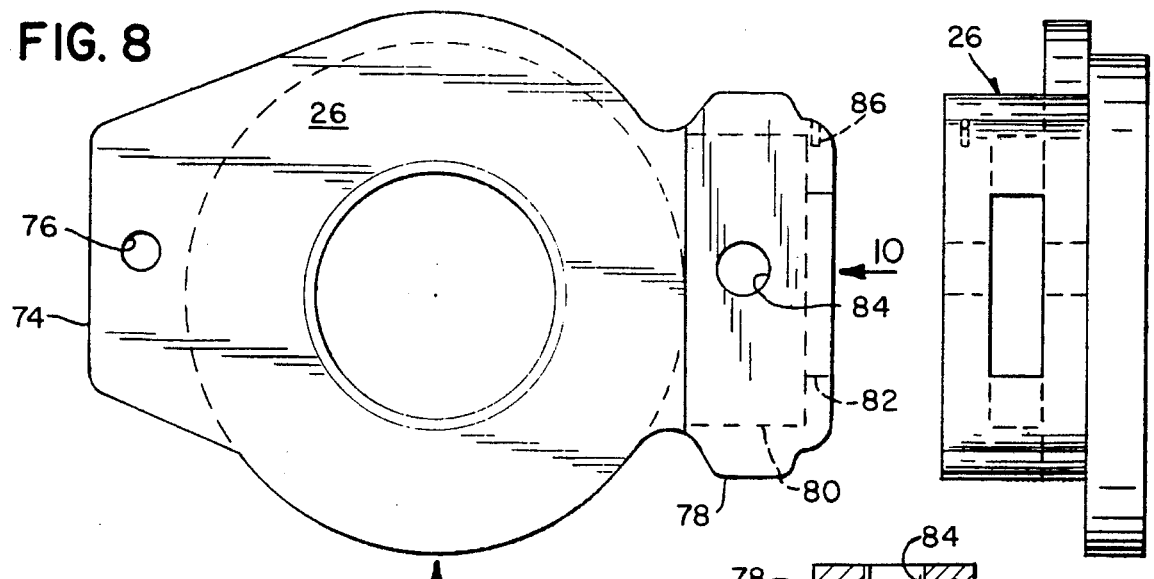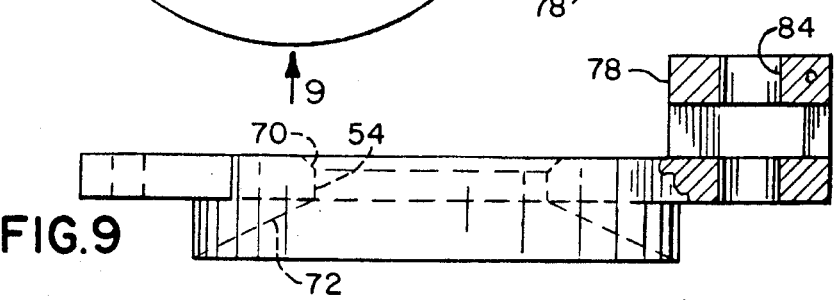

SCISSOR CLOSURE COUPLER FOR GOOSENECK TRAILERS

BACKGROUND OF THE INVENTION

The invention relates to a scissor closure coupler for gooseneck trailers. More particularly, the invention relates a scissor coupler that mates with a trailer hitch ball.

U.S. Pat. Nos. 5,080,386 to Lazar, and 5,161,815 to Penor, disclose self-aligning trailer hitch assemblies.

U.S. Pat. Nos. 5,040,817 to Dunn, 5,120,080 to Ritter, 5,147,096 to Rogers, and 5,167,423 to Hall Jr., disclose trailer hitch assemblies.

While these units may be suitable for the particular purpose employed, or for general use, they would not be as suitable for the purposes of the present invention as disclosed hereafter.

SUMMARY OF THE INVENTION

It is an object of the invention to produce a scissor coupler that quickly and automatically aligns with a trailer hitch ball.

It is another object to produce a scissor coupler in which the lock pin holes automatically align with the lock pin.

It is a further object of the invention to produce a scissor coupler that is self contained, providing flexibility in the method used to mount the scissor coupler to the trailer.

The invention is a scissor coupler, for attaching to a trailer hitch ball having a widest point and a neck, comprising a top plate, a bottom plate, a hinge bolt, and a main spring connected between the top plate and bottom plate. The hinge bolt attaches the top plate and bottom plate so that they can pivot relative to one another from a closed position to an open position. The top plate and bottom plate have top plate and bottom plate bores teat have a slightly larger diameter than the widest point of the trailer hitch ball, and are concentric when the top plate and bottom plate are in the open position. The top plate and bottom plate bores are not concentric when the scissor coupler is in the closed position. When the top plate and bottom plate are in the closed position, an elliptical hole is formed therebetween that is narrower than the widest point but wider than the neck of the trailer hitch ball. The main spring biases the scissor coupler to the closed position.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like reference numerals depict like elements throughout the several views. The drawings are briefly described below.

FIG. 6 is an enlarged plan view of the top plate of the instant invention.

FIG. 7 is a side elevational view taken in the direction of arrow 7 in FIG. 6.

FIG. 8 is an enlarged plan view of the bottom plate of the instant invention.

FIG. 9 is a side elevational view taken in the direction of arrow 9 in FIG. 8.

FIG. 10 is a side elevational view taken in the direction of arrow 10 in FIG. 8.

DETAILED DESCRIPTION OF THE PREFERRED EMBODIMENTS

Figure 1:
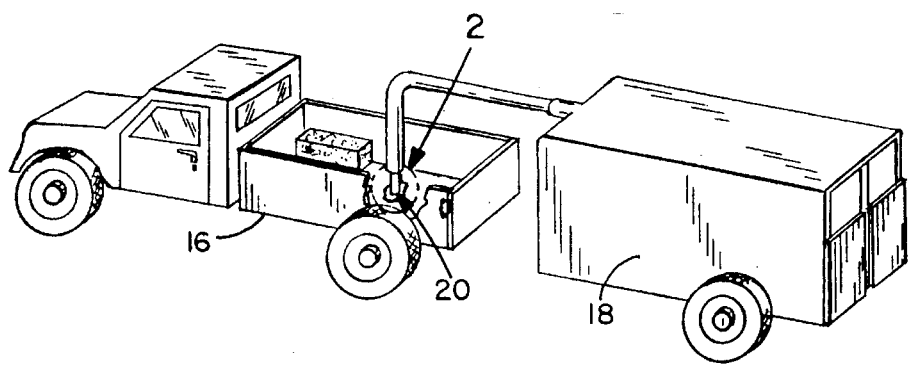
FIG. 1 is a diagrammatic perspective view of the instant invention in use installed on a gooseneck trailer being towed by a truck.

FIG. 1 illustrates a truck 16 connected to a gooseneck trailer 18 with a scissor coupler 20.

Figure 2:
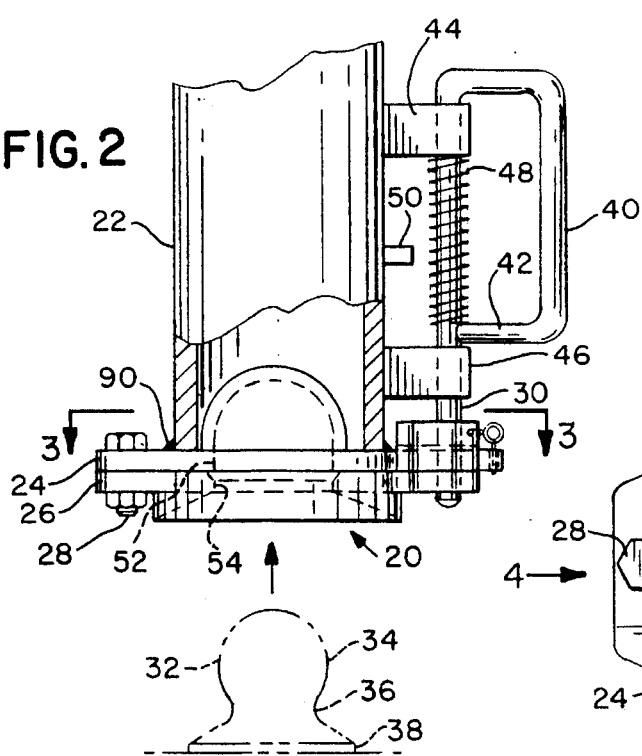
FIG. 2 is a partial side elevational view with parts broken away of the instant invention taken in the area indicated by arrow 2 in FIG. 1.

FIG. 2 illustrates the scissor coupler 20 welded at area 90 to a vertical tube 22, which quite often is generally part of the gooseneck trailer 18. The scissor coupler 20 has a top plate 24 and a bottom plate 26. The top plate 24 and bottom plate 26 are attached by a hinge bolt 28. A lock pin 30 extends vertically through the top plate 24 and bottom plate 26 when the scissor coupler is in a closed position.

The scissor coupler 20 is designed to accommodate a trailer hitch ball 32. The trailer hitch ball 32 is substantially spherical. The trailer hitch ball 32 is attached to a base 38. The trailer hitch ball 32 has a widest point 34, and a neck 36 where the trailer hitch ball 32 is attached to the base 38. The neck is narrower than the widest point 34. The base 38 is wider than the neck 36, and is generally wider than the widest point 34 of the trailer hitch ball 32.

The lock pin 30 is attached to a lock pin handle 40 having a handle lower member 42 which extends horizontally from the lock pin 30. The lock pin 30 is attached to the vertical tube 22 by extending vertically through an upper pin guide 44 and through a lower pin guide 46. The handle lower member 42 extends horizontally from the lock pin 30 at a point between the upper pin guide 44 and lower pin guide 46.

A lock pin spring 48 mounted on the lock pin 30 between the upper pin guide 44 and handle lower member 42 biases the lock pin down toward the scissor coupler 20, and biases the handle lower member 42 against the lower pin guide 46.

The handle 40 is used to lift the lock pin 30 from the scissor coupler 20, compressing the lock pin spring 48. The lock pin 30 may be retained in the lifted state by rotating the lock pin 30 on its axis using the lock pin handle 40 and resting the handle lower member 42 against a retaining lug 50 that is attached to the vertical tube 22 between the upper pin guide 44 and lower pin guide 46.

The top plate 24 has an top plate bore 52 near the center of the top plate 24. The top plate bore 52 has a diameter that is slightly larger than the widest point 34 of the trailer hitch ball 32. The bottom plate 26 has a bottom plate bore 54 near the center of the bottom plate 26. The bottom plate bore 54 has a diameter that is substantially the same as the diameter of the top plate bore 52.

FIG. 6 and FIG. 7 illustrate the top plate 24. The top plate has a hollow half sphere 56 attached to the top plate 24 directly above the top plate bore 52 and concentric therewith. A hollow cavity 58 formed within the hollow half sphere 56 is large enough to accommodate a majority of the trailer hitch ball 32.

The top plate 24 has a top plate hinge end 58 where a top plate hinge hole 60 is located. Opposite the top plate hinge end 58 is a lock plate 62, having a top plate lock pin hole 64. The lock plate 62 has a spring plate 66 having a spring plate hole 68.

FIG. 8, FIG. 9, and FIG. 10 illustrate the bottom plate 26.

Extending up from the bottom plate bore 54 is an upper bevel 70. The upper bevel 70 allows downward pressure from the trailer hitch ball 32 to move the bottom plate 26 until the top plate bore 52 matches the bottom plate bore 54 and allowing the trailer hitch ball 32 travel downward therethrough.

Extending down from the bottom plate bore 54 is a lower bevel 72. The lower bevel 72 allows upward pressure from the trailer hitch ball 32 to move the bottom plate 26 until the top plate bore 52 matches the bottom plate bore 54 and the trailer hitch ball 32 can travel upward therethrough. The lower bevel 72 also guides the trailer hitch ball 32 until it lines up with the bottom plate bore 54.

The bottom plate 26 has a bottom plate hinge end 74 where a bottom plate hinge hole 76 is located. At an opposite end from the bottom plate hinge end 74, the bottom plate 26 has a lock housing 78. The lock housing 78 has a lock channel 80, extending horizontally partially through the lock housing 78, and a spring channel 82 extending horizontally from the lock channel 80 the rest of the way through the lock housing 78.

A bottom plate lock pin hole 84 extends vertically through the lock housing 78. The lock housing 78 has a spring hole 86.

Figure 3:
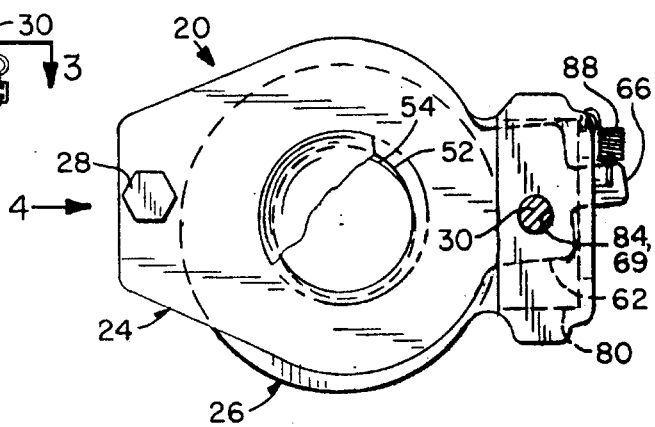
FIG. 3 is a top plan view taken on line 3—3 of FIG. 2 with the tube removed for clarity with parts broken away with the coupler in a closed position.
Figure 5:
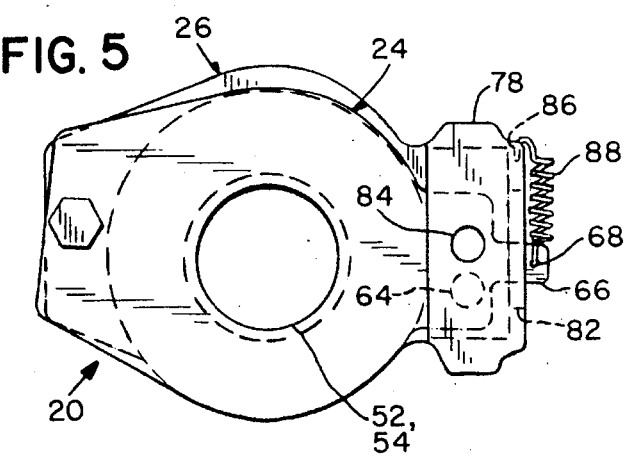
FIG. 5 is a top plan view similar to FIG. 3 but with the coupler in an open position.
Figure 4:
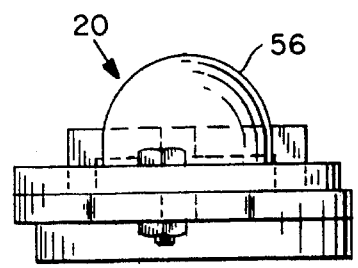
FIG. 4 is a side elevational view taken in the direction of arrow 4 in FIG. 3.

FIG. 3 illustrates the scissor coupler 20 in the closed position, and FIG. 5 illustrates the scissor coupler 20 in the open position.

The top plate 24 rests atop the bottom plate 26, with the lock plate 62 of the top plate 24 extending into the lock channel 80 of the bottom plate 26. The spring plate 66 extends through the spring channel 82. The spring plate 66 is connected to the lock housing 78 with a main spring 88. The main spring is attached at one end in the spring hole 86 in the lock housing 78, and is attached at its other end in the spring plate hole 68 of the spring plate 66. The spring plate 66 projects from the lock plate 62 of the top plate 24. The lock plate 62 sits within the lock channel 80 of the bottom plate 26 with the spring plate 66 passing through and projecting from the spring channel 82 of the bottom plate 26. The main spring 88, which is attached at one end to the spring plate 66 and at the other end to the lock housing 78 of the bottom plate 26, biases the lock housing 78 to the top plate 24 allowing the bottom plate 26 to move relative to the top plate 24.

The top plate 24 is connected to the bottom plate 26 with the hinge bolt 28 that extends through the top plate hinge hole 60 and the bottom plate hinge hole 76. The top plate 24 and bottom plate 26 pivot with respect to one another around the hinge bolt 28.

The top plate 24 and bottom plate 26 pivot to an open position, illustrated in FIG. 5. In the open position, the main spring 88 is stretched as the lock plate 62 moves horizontally in the lock channel 80. The bottom plate lock pin hole 84 in the lock housing 78 is not concentric with the top plate lock pin hole 64.

As seen in FIG. 5 with the hollow half sphere 56 removed and the scissor coupler 20 in the open position, the top plate bore 52 and bottom plate bore 54 are concentric. The trailer hitch ball 32 can easily travel vertically through both the top plate bore 52 and the bottom plate bore 54.

FIG. 3 illustrates the scissor coupler 20 in the closed position with the hollow half sphere 56 partially removed. In the closed position, the main spring 88 is restored to an unstretched equilibrium position. The bottom plate lock pin hole 84 in the lock housing 78 is concentric the top plate lock pin hole 64, and here the lock pin 30 is shown inserted therethrough. With the lock pin 30 inserted through both the bottom plate lock pin hole 84 in the lock housing 78 and the top plate lock pin hole 64, the top plate 24 and bottom plate 26 are prevented from relative pivotal movement about the hinge bolt 28.

In the closed position, the top plate bore 52 and bottom plate bore 54 have moved relative to one another, making them no longer concentric. Since the top plate bore 52 and bottom plate bore 54 are substantially the same diameter, their difference in centers creates an elliptical hole between them that is smaller than either bore.

By adjusting the degree of pivotal relative movement of the top plate 24 and bottom plate 26, a minor axis of this elliptical hole is made to be wider than the neck 36 of the trailer hitch ball 32, but is narrower than the widest point 34 of the trailer hitch ball 32. When properly calibrated, in the closed position, the scissor closure 20 will trap the trailer hitch ball 32 at the neck 36. The scissor coupler 20 is then locked in the closed position by inserting the lock pin 30 bottom plate lock pin hole 84 and top plate lock pin hole 64.

The coupling operation is performed as follows:

Initially the scissor coupler 20 is in the closed position. As the scissor coupler 20 is lowered on to the trailer hitch ball 32, the trailer hitch ball 32 is brought into contact with the lower bevel 72. The lower bevel 72 guides the trailer hitch ball 32 toward the bottom plate bore 54. As the trailer hitch ball 32 encounters the top plate bore 52 that it will not fit through, the upward pressure of the trailer hitch ball 32 forces the bottom plate 26 aside into the open position where the trailer hitch ball can freely travel upward through both the bottom plate bore 54 and top plate bore 52. Once the widest point 34 of the trailer hitch ball 32 has traveled past the bottom plate bore 54, the main spring 88 moves the bottom plate 26 to the closed position, capturing the trailer hitch ball 32 at the neck 36, and aligning the top plate lock pin hole 64 and bottom plate lock pin hole 84. The lock pin 30 can then be inserted through both lock pin holes to lock the scissor coupler 20 in the closed position.

To uncouple the scissor coupler 20, the lock pin 30 is removed, and the trailer hitch ball 32 is pulled from the scissor closure 20 with a trailer jack. Once again, the bottom plate 26 slides to the open position under the pressure of the widest point 34 of the trailer hitch ball 32, allowing the trailer hitch ball 32 to exit the scissor coupler 20. Once the trailer hitch ball is removed from the scissor coupler 20, the main spring 88 returns the scissor coupler 20 back to the closed position.

What is claimed is:

1. A scissor closure coupler for gooseneck trailers, for attaching to a trailer hitch ball having a widest point and a neck, comprising:

a) a bottom plate, having a bottom plate bore having a diameter substantially the same as a the widest point of the trailer hitch ball and a bevel contained on said bottom plate for guiding said trailer hitch ball into said bottom plate bore;

b) a top plate, the top plate atop the bottom plate, the top plate having a top plate bore having a diameter substantially the same as the bottom plate bore;

c) a hinge bolt, connecting the top plate to the bottom plate allowing the top plate and bottom plate to pivot with respect to each other from a closed position to an open position; and d) a main spring, connecting the top plate and the bottom plate, biasing the top and bottom plate to remain in the closed position, wherein in the open position, the top plate bore and bottom plate bore are concentric, allowing the widest point of the trailer hitch ball to travel through both the top plate bore and bottom plate bore, and wherein in the closed position, the top plate bore and bottom plate bore are not concentric creating an elliptical hole between them, a minor axis of the elliptical hole is narrower than the widest point of the trailer hitch ball but is wider than the neck of the trailer hitch ball so that the elliptical hole can trap the trailer hitch ball at the neck.

2. The apparatus as recited in claim 1, further comprising a lock pin, and wherein the top plate further comprises a top plate lock pin hole and the bottom plate comprises a bottom plate lock pin hole, the two lock pin holes are not concentric when in the open position, the lock pin holes are concentric when in the closed position, the lock pin is inserted into the lock pin holes to lock the scissor coupler in the closed position.

3. The apparatus as recited in claim 2, wherein the top plate further comprises a hollow half sphere mounted concentric with the top plate bore.

4. The apparatus as recited in claim 3, further comprising an area for mounting a vertical tube of a gooseneck trailer to the top plate.

5. The apparatus as recited in claim 4, further comprising an upper pin guide attached to the vertical tube, a lower pin guide attached to the vertical tube, the lock pin extending through the upper pin guide and lower pin guide.

6. The apparatus as recited in claim 5, further comprising a lock pin spring, a retaining lug attached to the vertical tube between the upper and lower pin guides, and a handle lower member attached to the lock pin between the upper and lower pin guides, the lock pin spring is mounted on the lock pin between the upper pin guide and handle lower member, the lock pin spring biasing the handle lower member against the retaining lug.

* * * * *